Patented Aug. 31, 1937

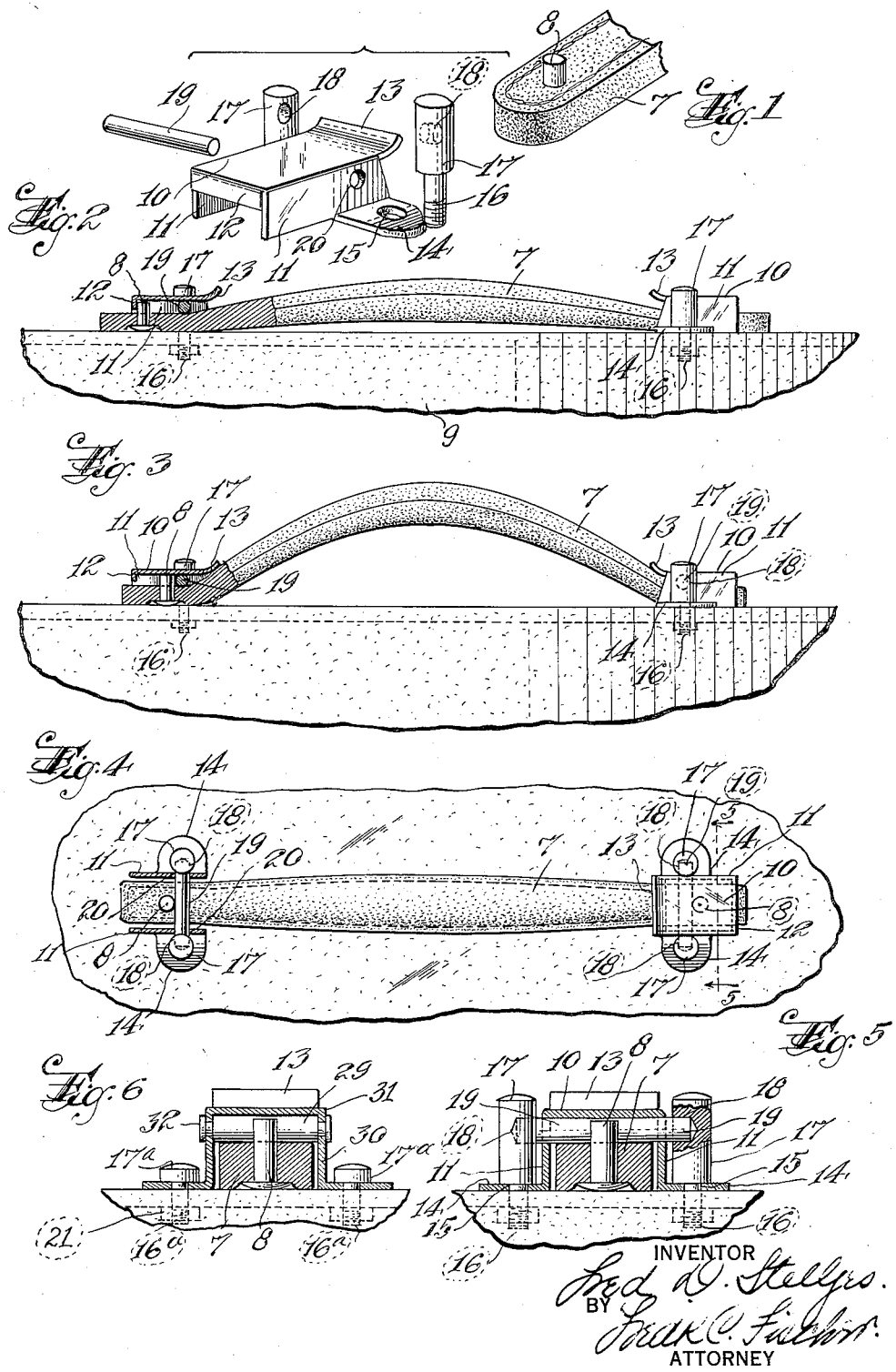

2,091,531

UNITED STATES PATENT OFFICE 2,091,531

HANDLE FOR LUGGAGE

Fred D. Stelljes, East Orange, N. J., assignor to T. & L. Company Incorporated, Newark, N. J., a corporation of New Jersey Application January 10, 1936, Serial No. 58,477

2 Claims. (Cl. 190—58)

This invention relates to improvements in handles for luggage by which term is included various types of hand carried, portable containers.

Handles as generally provided for heavy luggage, such as traveling bags, and the like, are subjected to large strains which gradually have a damaging effect, resulting in a complete breaking of the handle, often under exasperating circumstances. It has been found that the failure of handles is due mainly to the manner in which they are attached to the main body of the container, and also to frictional and rubbing engagement of the handles with metal parts when the handles are stressed in use.

It is, therefore, an object of this invention to provide a handle for luggage having means enabling it to be attached to the main body of a container in a manner to so distribute the strains upon the handle that damaging effects are eliminated.

A further object is to provide a simple means of attaching a handle to a container whereby rubbing and frictional contact with metal parts is eliminated.

These and other advantageous objects, which will later appear, are accomplished by the simple and practical construction and arrangement of parts hereinafter described and exhibited in the accompanying drawing, forming part hereof, and in which:

Fig. 1 is an exploded perspective view of the device for attaching a handle to a container in accordance with my invention, Fig. 2 is a side elevational view of a handle embodying the invention when not subjected to strains, Fig. 3 is a side elevational view of the handle when subjected to a strain, Fig. 4 is a plan view of the handle with the cover of the attaching means removed at one end thereof, Fig. 5 is a sectional view taken on line 5—5 of Fig. 4, and Fig. 6 is a sectional view of a modified form of the attaching means for the handle.

Referring to the drawing, there is shown a strap handle 7 of a well known type, usually formed from a plurality of layers of leather or similar material.

At each end of the strap is a rigid stud 8 projecting above the upper surface thereof.

Attached to a container 9 are a pair of spaced casings 10 having side walls 11, one end being provided with a downturned flange 12, and the other end having an upturned lip 13. The side walls 11 have at their lower edges laterally extending ears 14, provided with apertures 15, through which pass threaded bolts 16, by which the casings are held to a container. The bolts 16 have enlarged heads 17 provided with recesses 18, receiving the ends of a pin 19 passing through apertures 20 in the walls 11. The pin 19 passes freely through the apertures 20 so that it can rotate freely.

In assembling the device, the casing 10 is attached to a container by the bolts 16 and the nuts 21. The ends of the strap 7 carrying the upwardly projecting studs 8 are entered beneath the upturned lip 13 into the casing, the flange 12 engaging the studs 8 to limit the outward movement of the strap, and the upturned lip 13 facilitates the movement of the strap in the opposite direction. The pins 19 are inserted through the apertures 20 in the side walls 11 of the casing and the ends of the pin sprung into the recesses 18 of the enlarged heads 17 of the bolts 16.

It will be seen that the engagement of the studs 8 and flanges 12 limits the movement of the strap in one direction, and the engagement of the studs 8 with the rotating pins 19 limits the movement of the strap in the opposite direction. When stresses are placed upon the strap they are transmitted from the studs 8 to the pins 19 and thence to the casings 10.

Referring to Fig. 2, the strap is shown in an unstressed position and the studs 8 are in engagement with the flanges 12. When a force is applied to the strap, the stud 8 moves into engagement with the rotating pin 19, and when moving into such position, the upper surface of the strap engages the pin 19, causing the latter to rotate, thereby preventing frictional and rubbing effects which would occur were the pin 19 stationary.

In Fig. 6 is shown a modified form of the invention in which a pin 29 is passed loosely through apertures in the walls 30 of the casing 31, and the ends of the pin are upset to provide heads 32 preventing its removal. In this form the enlarged heads 17 and recesses 18 as described in connection with Fig. 1 are dispensed with, and heads 17a are substituted therefor.

From the above description it will be seen that I have provided a simple and effective device for attaching handles to luggage, such as traveling bags and the like, which prevents damaging wear upon the strap handle. The strains are placed directly upon the metal parts; and when the strap shifts from one position to another there is no frictional abrasive or rubbing engagement of the strap with stationary metal parts to cause wear and tear as heretofore has been the case in devices of this kind.

The foregoing disclosure is to be regarded as descriptive and illustrative only, and not as restrictive or limitative of the invention, of which an embodiment may be constructed including many modifications, without departing from the general scope herein indicated and denoted in the appended claims.

Having thus described my invention, what I claim as new and desire to secure by Letters Patent, is:

1. In a handle for hand luggage, a strap having a stud projecting upwardly from one end thereof, a casing receiving said strap and having a downturned flange engageable with said stud to limit the outward movement of the strap, said casing having side walls provided with outwardly projecting ears, bolts passing through said ears for attaching the casing to an article of luggage, said bolts having enlarged heads provided with recesses, a pin rotatably mounted in the side walls of the casing and having its ends positioned in the recesses of said heads, said rotatable pin being engageable with the stud projecting from the strap to limit the movement of the strap in the opposite direction.

2. In a handle for luggage, a strap having a stud projecting from one end thereof, a casing receiving said end of the strap, means on the casing engageable with the stud to limit the outward movement of the strap, said casing having side walls, a pin rotatably mounted in said side walls and engageable with the stud projecting from the strap to limit the movement of the strap in the opposite direction, and bolts for attaching the casing to an article of luggage, said bolts having heads provided with recesses in which are positioned the ends of the pin rotatably mounted in said side wall.

FRED D. STELLJES.